US012603916B2

(12) United States Patent
Woodworth et al.

(10) Patent No.: US 12,603,916 B2
(45) Date of Patent: Apr. 14, 2026

(54) SYSTEMS AND METHODS FOR INCREASED SECURITY USING CLIENT ADDRESS MANIPULATION

(71) Applicant: Level 3 Communications, LLC, Denver, CO (US)

(72) Inventors: John R.B. Woodworth, Amissville, VA (US); Dean Ballew, Sterling, VA (US); Lisa Lamanna, Harrisonburg, VA (US); James C. Anders, Lee's Summit, MO (US); Dan Luther, Claremore, OK (US); Carol D. Lovell, West Monroe, LA (US)

(73) Assignee: Level 3 Communications, LLC, Denver, CO (US)

( * ) Notice: Subject to any disclaimer, the term of this patent is extended or adjusted under 35 U.S.C. 154(b) by 61 days.

(21) Appl. No.: 18/629,065

(22) Filed: Apr. 8, 2024

(65) Prior Publication Data

US 2024/0340307 A1     Oct. 10, 2024

Related U.S. Application Data

(60) Provisional application No. 63/495,227, filed on Apr. 10, 2023.

(51) Int. Cl.
*H04L 29/06* (2006.01)
*H04L 9/40* (2022.01)

(52) U.S. Cl.
CPC ...... *H04L 63/1458* (2013.01); *H04L 63/1416* (2013.01)

(58) Field of Classification Search
CPC ........................ H04L 63/1458; H04L 63/1416
See application file for complete search history.

(56) References Cited

U.S. PATENT DOCUMENTS

| | | | |
|---|---|---|---|
| 2002/0107960 A1* | 8/2002 | Wetherall | H04L 63/1466 709/225 |
| 2005/0166049 A1* | 7/2005 | Touitou | H04L 63/1466 713/170 |
| 2007/0030850 A1* | 2/2007 | Grosse | H04L 63/1458 370/392 |
| 2007/0097976 A1* | 5/2007 | Wood | H04L 63/1416 370/392 |
| 2017/0374088 A1* | 12/2017 | Pappu | H04L 61/4511 |

OTHER PUBLICATIONS

International Search Report and Written Opinion of the International Searching Authority, dated Jun. 21, 2024, Int'l Appl. No. PCT/US2024/023541, Int'l Filing Date Apr. 8, 2024; 10 pgs.

* cited by examiner

*Primary Examiner* — Ka Shan Choy

(57) ABSTRACT

In a network system in which a server receives packets each including a source address, and in which the server ordinarily responds to each packet, Distributed Denial of Service attacks may be launched by malicious actors controlling a plurality of network devices. In such an attack, the attacking devices may spoof the IP address of a legitimate device, e.g., they may include, in each packet, the source address of the legitimate device. As such, systems and methods for increased security using client address manipulation are provided.

17 Claims, 7 Drawing Sheets

200

200

| Attacking client 1 115a | Attacking client 2 115b | Router 120 | Server 110 | | Threat intelligence 125 |
|---|---|---|---|---|---|
| | | | First address | Second address | |

230 First packet

232 First packet

234 Second packet

236 Second packet

238 Notification

240 Instructions

242 Instructions

244 Instructions

246 Third packet

248 Disregard

250 Fourth packet

252 Disregard

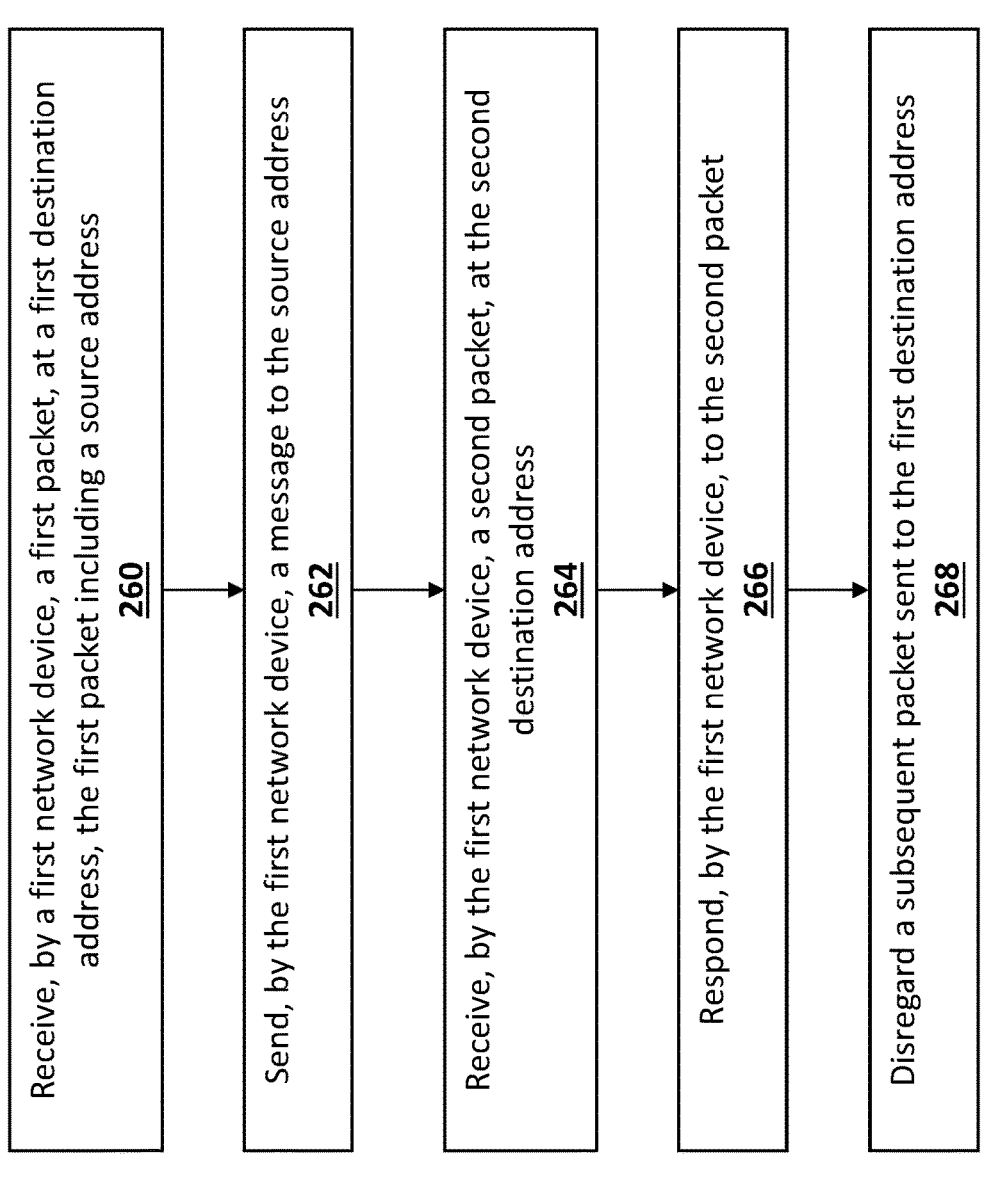

Receive, by a first network device, a first packet, at a first destination address, the first packet including a source address
260

Send, by the first network device, a message to the source address
262

Receive, by the first network device, a second packet, at the second destination address
264

Respond, by the first network device, to the second packet
266

Disregard a subsequent packet sent to the first destination address
268

FIG. 2C

SYSTEMS AND METHODS FOR INCREASED SECURITY USING CLIENT ADDRESS MANIPULATION

CROSS-REFERENCE TO RELATED APPLICATIONS

This application claims the benefit of U.S. Provisional Application No. 63/495,227 filed Apr. 10, 2023, entitled "Systems and Methods for Increased Security Using Client Address Manipulation," which is incorporated herein by reference in its entirety.

FIELD

One or more aspects of examples according to the present disclosure relate to networking, and more particularly to systems and methods for increased security using client address manipulation.

BACKGROUND

In a network system in which a server receives packets that each includes a source address, and in which the server ordinarily responds to each packet, a Distributed Denial of Service attack may be launched by a malicious actor controlling a plurality of network devices. In such an attack, the attacking devices may spoof the IP address of a legitimate device, e.g., they may include, in each packet, the source address of the legitimate device.

It is with respect to this general technical environment that aspects of the present disclosure are related.

SUMMARY

Systems and methods for increased security using client address manipulation are provided. In an aspect, a method includes receiving, by a first network device, a first packet, at a first destination address, the first packet including a source address; and sending, by the first network device, a message to the source address, the message including a second destination address and instructions, the second destination address being unpublished, the instructions instructing the recipient of the message to send subsequent packets to the second destination address.

In another aspect, a network device comprises a processing circuit, and memory, operatively connected to the processing circuit and storing instructions that, when executed by the processing circuit, cause the network device to perform a method. In examples, the method comprises: receiving, by the network device, a first packet, at a first destination address, the first packet including a source address; receiving notification of a denial of service attack associated with the source address; sending, by the network device, a message to the source address, the message including a second destination address and instructions, the instructions instructing the recipient of the message to send subsequent packets to the second destination address; and sending, by the network device, a message to a network routing device, to drop subsequent packets addressed from the source address and to the first destination address.

In another aspect, a method includes receiving, by a first network device, a first packet, at a first destination address, the first packet including a source address; and sending, by the first network device, a message to the source address, the message including a second destination address and instructions, the second destination address being unpublished, the instructions instructing the recipient of the message to send subsequent packets to the second destination address; receiving, by the first network device, a second packet, at the second destination address; and responding, by the first network device, to the second packet.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

These and other features and advantages of the present disclosure will be appreciated and understood with reference to the specification, claims, and appended drawings. Non-limiting and non-exhaustive examples are described with reference to the following figures, wherein:

FIG. 2C is a flow chart of a method, according to an example of the present disclosure.

DETAILED DESCRIPTION

The detailed description set forth below in connection with the appended drawings is intended as a description of exemplary embodiments of systems and methods for increased security using client address manipulation provided in accordance with the present disclosure and is not intended to represent the only forms in which the present disclosure may be constructed or utilized. The description sets forth the features of the present disclosure in connection with the illustrated examples. It is to be understood, however, that the same or equivalent functions and structures may be accomplished by different examples that are also intended to be encompassed within the scope of the disclosure. As denoted elsewhere herein, like element numbers are intended to indicate like elements or features.

Figure 1A:
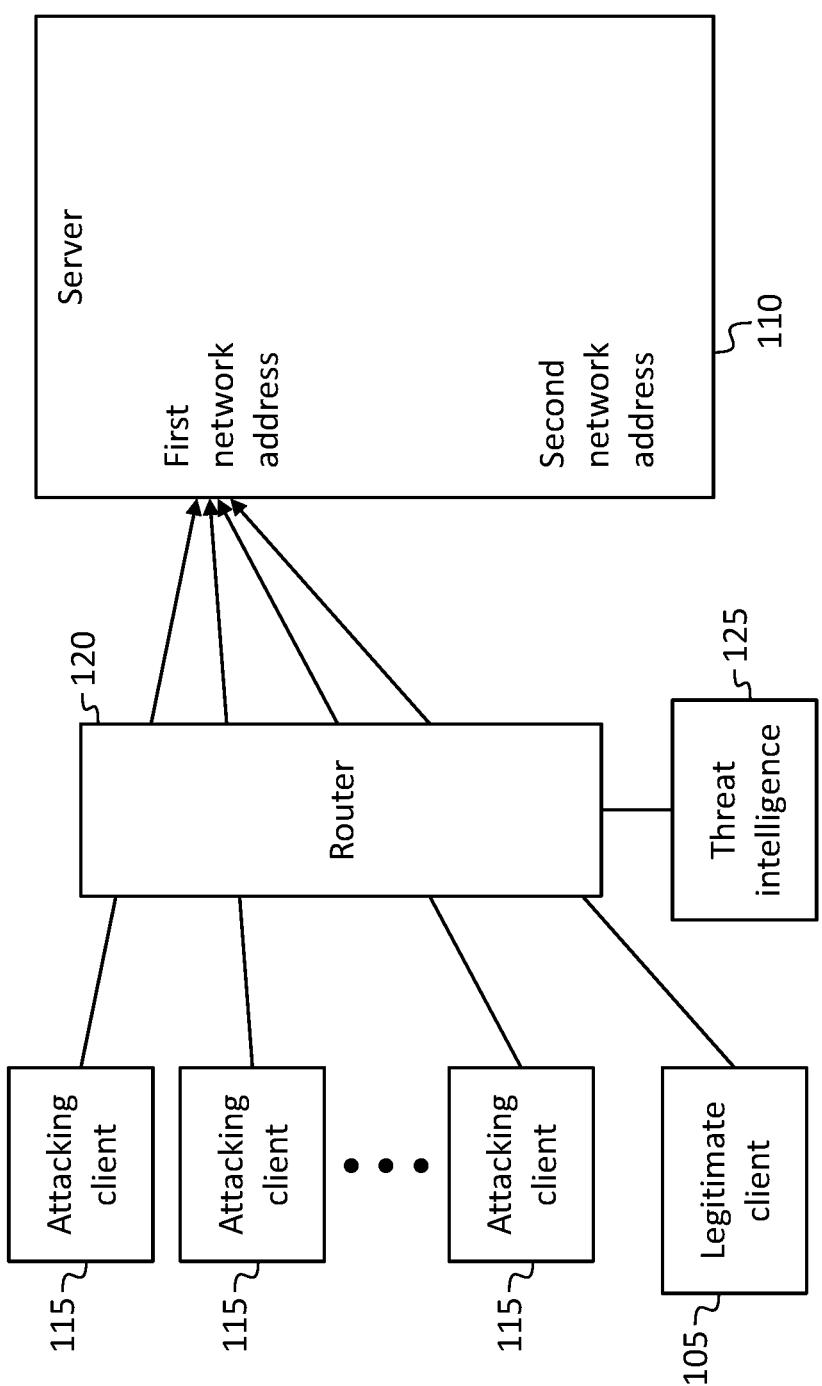
FIG. 1A is a block diagram of a portion of a network, according to an example of the present disclosure.

Referring to FIG. 1A, in some examples, a legitimate client 105 (which may be a network device) may submit, via a router 120, a request to a first network address of a server 110 (which may also be a network device). As used herein, a "network device" is any communication device or computing device connected to a network, e.g., any device connected to the Internet, a wide-area network, local-area network, or otherwise. The request may be a request for a service, such as a Domain Name System (DNS) lookup request, requesting an Internet Protocol address corresponding to a domain. In some circumstances, the request may be transmitted in a packet (e.g., in an Internet Protocol (IP), Internet Control Message Protocol (ICMP), etc.) using a network transport protocol, such as the User Datagram Protocol (UDP), that does not involve the setting up of a connection before data are exchanged. In such circumstances, a distributed denial of service (DDoS) attack may be performed by a malicious actor controlling a large number of attacking clients 115 (which may be network devices, and which may be (i) owned by the malicious actor or (ii) merely commandeered (e.g., as a result of an earlier attack, on the devices themselves) by the malicious actor), by configuring each of the attacking clients 115 to send packets to a network device being attacked. In examples, each of the attacking clients 115 may spoof the source address of a legitimate client 105, e.g., each of the attacking clients 115 may include, in each packet it sends, as the purported source address for the packet, the network address of the legitimate client 105, so that the server 110 (or a network switching device, e.g., a router, forwarding such packets to the server 110) may be unable to distinguish between packets sent from the legitimate client 105 and packets sent by attacking clients 115.

In some examples, a DDoS attack targeting a first destination address may be mitigated, as follows. Once a DDoS attack is detected (e.g., by a threat intelligence system 125), the server 110 may send, to the source address associated with the DDoS attack, a message including instructions instructing the recipient to send subsequent packets to a second destination address, different from the first destination address, and the server 110 may cease to respond to packets sent to the first destination address. For example, the threat intelligence system 125 may detect an attack and cause the mitigation (causing the server to send the instructions, and possibly redirecting (as discussed in further detail below) traffic to the second destination address and blocking traffic to the first destination address) upon detection of the attack. As used here, any address referred to as a "source address", a "destination address" or a "network address" may comprise a combination of an Internet Protocol address and a port number, so that if a first destination address is different from a second destination address, it means that (i) the IP address of the first destination address is different from the IP address of the second destination address, or (ii) the port of the first destination address is different from the port of the second destination address (or both). In examples, the second destination address may be unpublished. For example, the second destination address may include the same IP address as the first destination address (so that traffic is still routable across the Internet to the server 110); however, the port of the second destination address may be different from the first destination address. In examples, the port of the second destination address may be private and unpublished. For example, if the server 110 is a DNS server, the server 110 may advertise that DNS query traffic should be sent to a particular IP address and port combination. The second destination IP address, however, may include that same IP address but a port that is reserved for this purpose and not advertised for DNS query traffic.

In some examples, the server 110 is configured to receive packets addressed to the second destination address, and the server 110 responds to any packets sent to the second destination address. For example, the server 110 may be associated with several IP addresses, including the IP address of the first destination address and the IP address of the second destination address (which may be different from the IP address of the first destination address). As another example, the first destination address and the second destination address may differ only by port number. In some examples, the second destination address is not associated with the server 110, but, as illustrated in FIG. 1C, it is instead associated with another network device (e.g., another server 112), which responds to the packets sent to the second destination address (the server 112 associated with the second destination address may be configured to respond to any such packets at any time, or it may begin responding to such packets in response to a request to do so from the server 110).

Figure 1B:
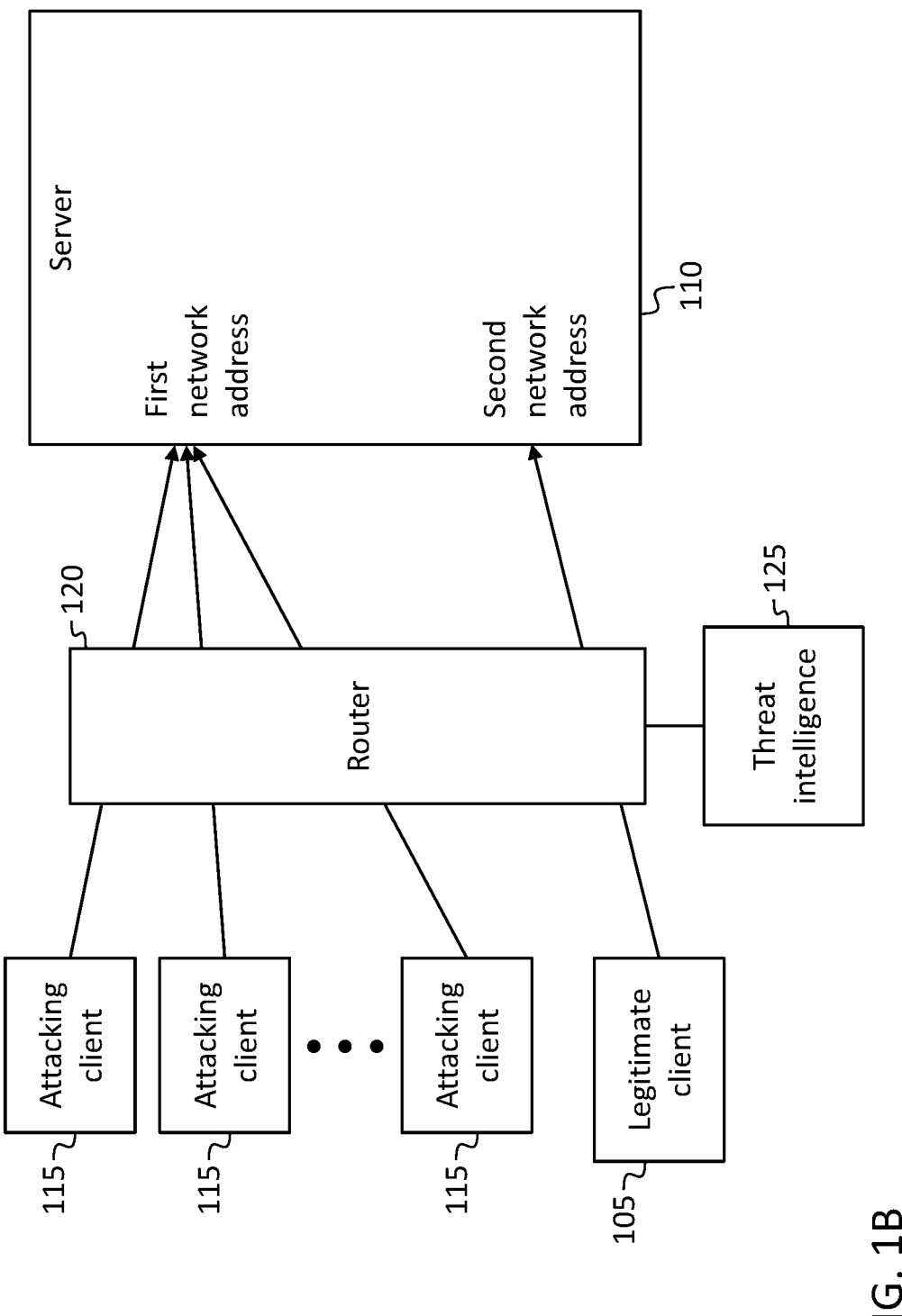
FIG. 1B is a block diagram of a portion of a network, according to an example of the present disclosure.
Figure 1C:
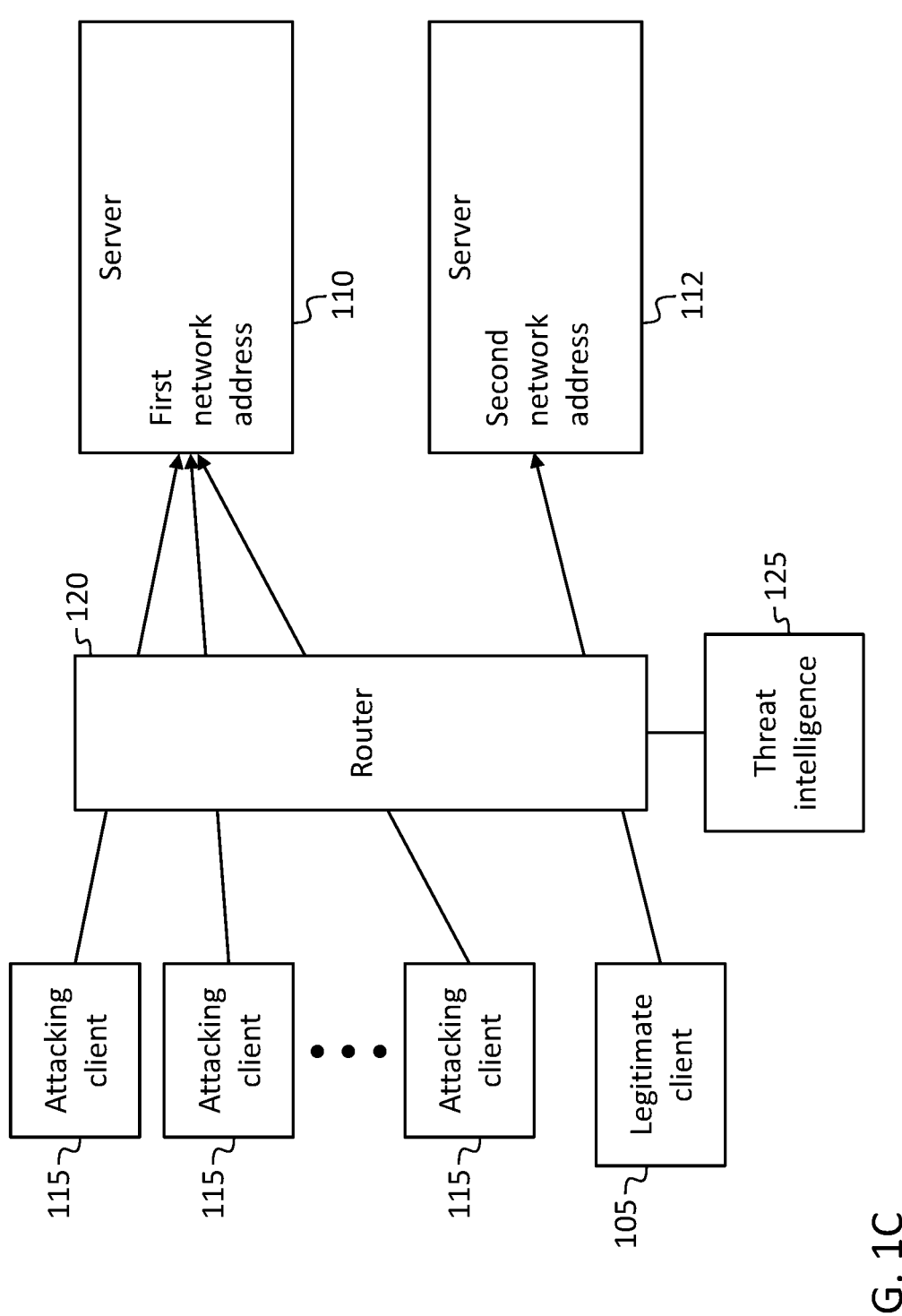
FIG. 1C is a block diagram of a portion of a network, according to an example of the present disclosure

If the source address associated with the attack is the network address of a legitimate client 105 (and this source address is being spoofed by one or more attacking clients attacking clients 115) then once the instructions have been sent, subsequent packets from the legitimate client 105 may be sent to the second destination address while subsequent packets from attacking clients 115 continue to be sent to the first destination address, as illustrated in FIG. 1B. The server 110 may therefore (as mentioned above) ignore packets received at the first destination address, and it may respond to packets received at the second destination address. In some examples, the server 110 (or the threat intelligence system 125, when a threat is detected and the threat mitigation service is turned on) may send a request to one or more network switching device (e.g., to the router 120) that is configured to forward packets to the server 110, requesting that any packets received, by the network switching device, addressed to the first destination address and having the particular source address, be dropped.

In some examples, the message with instructions sent by the server 110 to the source address may instruct the recipient to send packets only temporarily to the second destination address, e.g., the instructions sent by the server 110 may further instruct the recipient to, after a set time interval, cease sending subsequent packets to the second destination address and resume sending packets to the first destination address. The time interval may be, e.g., between 5 minutes and 60 minutes, and it may be chosen to exceed the expected duration of the attack. Thus, if the attack ends as expected, normal operation will resume automatically. During the time interval, the volume of inbound traffic at the first destination address may be monitored (e.g., by the server 110, or by the threat intelligence system 125, or by a network switching device, e.g., a router 120, connected to the server 110 and configured to (i) drop packets addressed to the first destination address and (ii) forward packets addressed to the second destination address) to assess whether the attack has ended. In examples, the server 110 and/or the threat intelligence system 125 may track the initiation and expiration of the time interval. In other examples, the time interval may be implemented by including filter instructions to the router 120 to drop packets from the source address to the first destination address during the time interval (e.g., by including a time-to-live for the particular filter instruction(s)). If, when the time interval is about to expire, the attack is continuing, the server 110 (e.g., acting on instructions or information from the threat intelligence system 125, which may be tracking the current period during which mitigation is happening for each source address) may send additional messages with instructions, as needed, (i) to extend the interval of time during which packets are to be sent to the second destination address, or (ii) instructing the recipient to send subsequent packets to a third destination address, different from the first and second destination addresses.

The system described above, of instructing traffic to be sent temporarily to a second destination address, may be effective at mitigating (i) attacks in which the attacking clients 115 spoof a source address (e.g., a randomly selected source address) that does not correspond to any of the attacking clients 115 and that does not correspond to any legitimate client 105, (ii) attacks in which the attacking clients 115 spoof a source address that corresponds to a legitimate client 105 and (iii) attacks in which each attacking client 115 uses a source address that corresponds to itself or another of the attacking clients 115, and the one or more attacking client(s) 115 is/are not configured to take any action in response to instructions that may be received from the server 110.

In some attacks the attacking clients 115 may use a source address that corresponds to a first attacking client 115 of the attacking clients 115, and the first attacking client 115 may be configured, upon receipt of a message instructing the recipient to send subsequent packets to a second destination address, different from the first destination address, to follow the instructions and to instruct the other attacking clients 115 accordingly. Or the attacking clients 115 may all be configured to use their own source IP addresses, and to follow instructions received from the server 110. Such an attack may be mitigated using other methods. For example, volumetric analysis may be employed to determine (e.g., based on a large, recent increase in the volume of traffic received from the network address used by the attacking clients 115) that the attacking clients 115 are participating in a DDoS attack, and packets received from the attacking clients 115 may be blocked (either by the server 110 or by a network switching device 120 connected to the server 110 and configured to route packets to the server 110).

Attacks of the kind described herein may take place in the context of a name service, e.g., a system including one or more Domain Name System (DNS) resolvers and one or more authoritative name servers for DNS. In such a system, a resolver may be implemented on the server 110 that is the target of a DDoS attack. That is, a plurality of attacking clients 115 may launch a DDoS attack on the resolver by sending a large volume of requests to the resolver, which may be implemented on server 110. In other circumstances, an authoritative name server may be implemented on the server 110 that is the target of a DDoS attack, and a plurality of attacking clients 115 may launch a DDoS attack on the authoritative name server by sending a large volume of requests to the authoritative name server. In the latter case, the attacking clients may spoof the source address of a resolver that regularly sends requests to the authoritative name server.

The message, sent by the server 110 to a source address being used in an attack and instructing the recipient to send subsequent packets to a second destination address, may be sent in various ways. The instructions may be sent in the transport layer of a packet (e.g., a UDP datagram) carrying the message. For example, if the server 110 is a DNS resolver or an authoritative name server for DNS, the instructions may be sent as attribute, value pairs in an Extension Mechanisms for DNS (EDNS) reply message. For example, a first attribute value and a second attribute value may respectively specify the IP address and port to which subsequent packets are to be sent, and a third attribute value may specify the time interval during which packets should be sent to the second destination address. In some examples, the message may be sent in an analogous manner in the network layer (e.g., in the IP layer) of a packet (e.g., using suitable fields within the IP Options portion of the IP header).

In some examples, a protocol that is different from the one employed by clients to submit requests to the server 110, or different from the one employed by the server 110 to send responses to clients (e.g., to a legitimate client 105) is employed to send the message instructing the recipient to send subsequent packets to a different destination address. For example, a protocol designed specifically for DDoS attack mitigation according to methods disclosed herein may be employed. In other examples, any protocol suitable for sending messages between network devices (e.g., a new ICMP message type) may be employed.

Figure 2A:
FIG. 2A is a flow chart of a method, according to an example of the present disclosure.

FIG. 2A shows a flow chart of a method, in a first example, involving an attacking client 115, a legitimate client 105, a router 120, a server 110, and a threat intelligence system 125. In the example of FIG. 2A, the attacking client 115 is spoofing (e.g., using) the source address of the legitimate client 105 in packets sent by attacking client 115. At 202, the attacking client 115 sends a first packet to the first destination address of the server 110, and the packet includes a source address associated with legitimate client 105. The first packet is received by the router 120 and forwarded, at 204, to the first destination address of the server 110. The legitimate client 105 sends, at 206, a second packet to the first destination address of the server 110. The second packet is received by the router 120 and forwarded, at 208, to the first destination address of the server 110. The threat intelligence system 125 detects that an attack is in progress and, at 210, notifies the server 110. In response to the notification and the receipt of the first packet and the second packet, the server 110 sends, at 212, to the source address of the first packet and the second packet, a message instructing the recipient to send subsequent packets to the second destination address of the server 110. These instructions may be forwarded, at 214, by the router 120 and received only by the legitimate client 105 because the source address is associated (e.g., in routing tables of router 120) only with legitimate client 105. Subsequently the attacking client 115 (not having received the instructions) may send, at 216, a third packet to the first destination address of the server 110, and the third packet may be forwarded, at 218, by the router 120, and disregarded, at 220, by the server 110. The legitimate client 105 may also send additional packets, e.g., sending, at 222, a fourth packet which is forwarded, at 224, by the router 120, received at the second destination address of the server 110, and processed, at 226, by the server 110.

Figure 2B:
FIG. 2B is a flow chart of a method, according to an example of the present disclosure.
Figure 2B:

FIG. 2B shows a flow chart of a method, in a second example, involving a first attacking client 115a, a second attacking client 115b, a router 120, a server 110, and a threat intelligence system 125. The second attacking client 115b may be a formerly legitimate device that has been compromised by a malicious actor, and that continues to use the same source address as it was using before it was compromised. The first attacking client 115a may be using (e.g., spoofing) the source address of the second attacking client 115b. At 230, the first attacking client 115a sends a first packet to the first destination address of the server 110. The first packet is received by the router 120 and forwarded, at 232, to the first destination address of the server 110. The second attacking client 115b sends, at 234, a second packet to the first destination address of the server 110. The second packet is received by the router 120 and forwarded, at 236, to the first destination address of the server 110. Both the first packet and the second packet may be processed normally by server 110. The threat intelligence system 125 detects that an attack is in progress and, at 238, notifies the server 110. In response to the notification and the receipt of the first packet and the second packet, the server 110 sends, (i) at 240, instructions to the router 120 instructing the router 120 to drop (e.g., disregard) packets sent, from the source address of the second attacking client 115b to the first destination address of the server 110 and (ii) at 242, a message to the source address of the first packet and the second packet, the message including instructions instructing the recipient to send subsequent packets to the second destination address of the server 110. The latter instructions may be forwarded, at 244, by the router 120 and received only by the second attacking client 115*b*. Subsequently the first attacking client 115*a* (not having received the instructions) may send, at 246, a third packet to the first destination address of the server 110, and the third packet may be dropped (e.g., disregarded), at 248, by the router 120. The second attacking client 115*b* (having received the instructions, but, e.g., not being configured to respond to the instructions) may also send additional packets, e.g., sending, at 250, a fourth packet to the first destination address of the server 110, which is dropped, at 252, by the router 120.

FIG. 2C is a flowchart of a method, in some examples. The method includes, at 260, receiving, by a first network device, a first packet, at a first destination address, the first packet including a source address. The first network device may be a server, e.g., a DNS resolver or an authoritative name server.

The method further includes sending, at 262, by the first network device, a message to the source address. The message may include a second destination address and instructions. The second destination address may be unpublished. The instructions may instruct the recipient of the message to send subsequent packets to the second destination address.

The method further includes receiving, at 264, by the first network device, a second packet, at the second destination address. The second packet may have been sent by a network device at the source address. This network device may be configured to follow the instructions sent at 262, for purposes of assisting with attack mitigation and of continuing to receive services from the first network device when an attack is in progress.

The method further includes responding, at 266, by the first network device, to the second packet. For example, if the second packet is a DNS lookup request and the first network device is a DNS resolver, the first network device may look up the domain name in its cache and generate and send a response accordingly.

The method further includes disregarding, at 268, a subsequent packet sent to the first destination address. This subsequent packet may have been sent by an attacking client 115 that is spoofing the source address and that is not configured to receive responses at the source address. As such, the attacking client 115 may not have received the instructions sent at 262, and it may continue to send packets to the first destination address. The packet may be disregarded by a second network device, which may be a router configured to forward packets to the first network device, or it may be disregarded by the first network device.

Figure 3:
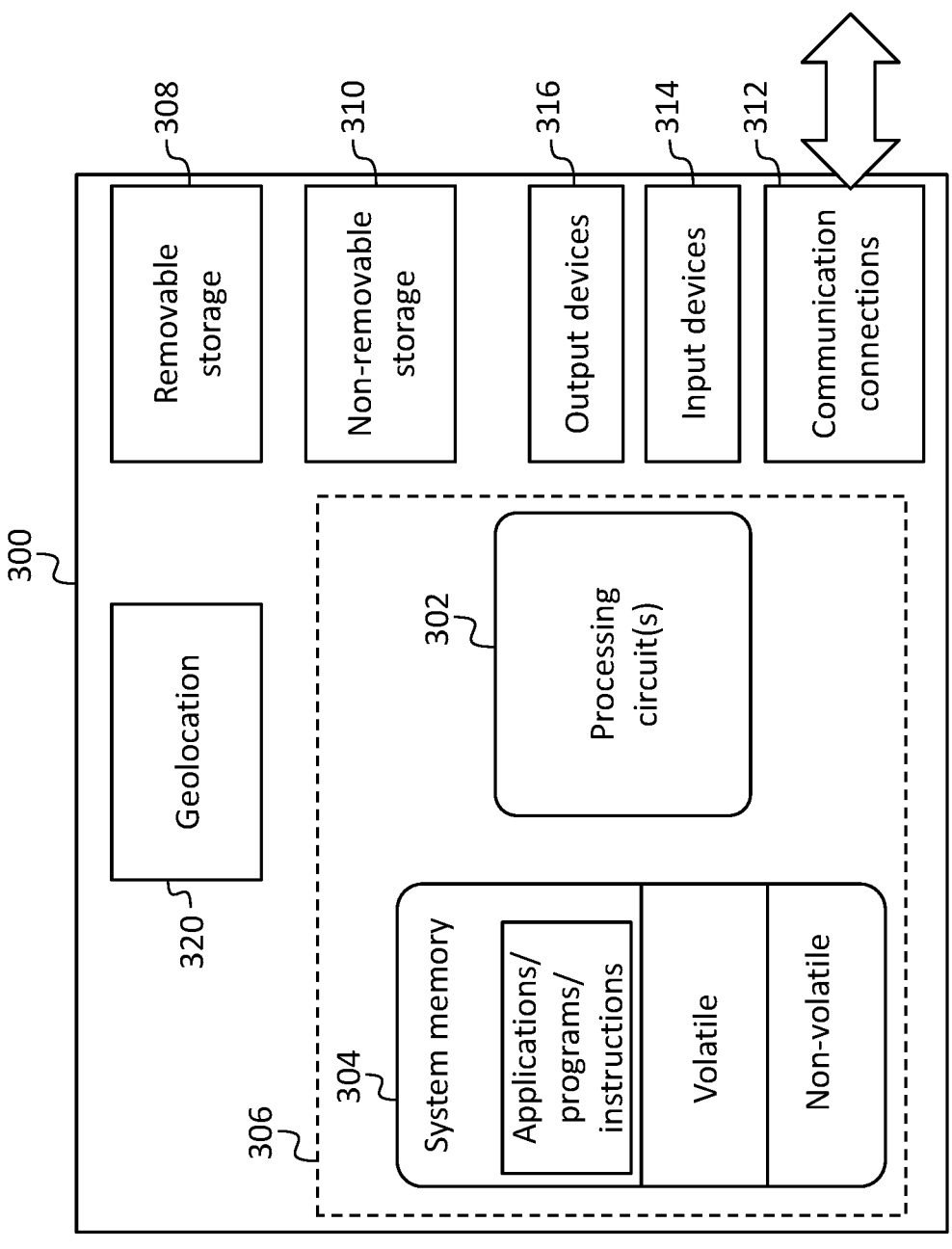
FIG. 3 is a block diagram of an operating environment, according to an example of the present disclosure.

FIG. 3 depicts an example of a suitable operating environment 300, portions of which may be used to implement the server 110, a network switching device (e.g., a router), the legitimate client 105, or other devices that may include computing functionality within the systems discussed herein. In its most basic configuration, operating environment 300 typically includes at least one processing circuit 302 and memory 304. The processing circuit may be a processor, which is hardware. Depending on the exact configuration and type of computing device, memory 304 (storing instructions to perform the methods disclosed herein) may be volatile (such as RAM), non-volatile (such as ROM, flash memory, etc.), or some combination of the two. This most basic configuration is illustrated in FIG. 3 by dashed line 306. The memory 304 stores instructions that, when executed by the processing circuit(s) 302, perform the processes and operations described herein. Further, environment 300 may also include storage (removable 308, or non-removable 310) including, but not limited to, solid-state, magnetic disks, optical disks, or tape. Similarly, environment 300 may also have input device(s) 314 such as keyboard, mouse, pen, voice input, etc., or output device(s) 316 such as a display, speakers, printer, etc. Additional communication connections 312 may also be included that allow for further communication with LAN, WAN, point-to-point, etc. Operating environment 300 may also include geolocation devices 320, such as a global positioning system (GPS) device.

Operating environment 300 typically includes at least some form of computer readable media. Computer readable media can be any available media that can be accessed by processing circuit 302 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of any of the above should also be included within the scope of computer readable media.

As used herein, the word "or" is inclusive, so that, for example, "A or B" means any one of (i) A, (ii) B, and (iii) A and B. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

Although exemplary embodiments of systems and methods for increased security using client address manipulation have been specifically described and illustrated herein, many modifications and variations will be apparent to those skilled in the art. Accordingly, it is to be understood that systems and methods for increased security using client address manipulation constructed according to principles of this disclosure may be embodied other than as specifically described herein. The invention is also defined in the following claims, and equivalents thereof.

What is claimed is:

1. A method, comprising:
receiving, by a first network device, a first packet, at a first destination address, the first packet including a source address; and
sending, by the first network device, a message to the source address, the message including a second destination address and instructions, the second destination address being unpublished, the instructions instructing the recipient of the message to send subsequent packets to the second destination address,
wherein the instructions are transmitted within the network layer of a second packet.

2. The method of claim 1, wherein the first network device is an authoritative name server.

3. The method of claim 1, wherein the first network device is a Domain Name System (DNS) resolver.

4. The method of claim 1, wherein the first packet is a User Datagram Protocol (UDP) packet.

5. The method of claim 1, wherein the instructions further instruct the recipient to, after a set time interval, cease sending subsequent packets to the second destination address and resume sending packets to the first destination address.

6. The method of claim 1, wherein the second packet is an Internet Protocol packet.

7. The method of claim 1, wherein the instructions are transmitted within the transport layer of a second packet.

8. The method of claim 1, further comprising disregarding, by the first network device, a subsequent packet sent to the first destination address.

9. The method of claim 1, further comprising disregarding, by a second network device, a subsequent packet sent to the first destination address, the second network device being connected to the first network device and configured to route packets to the first network device.

10. The method of claim 1, wherein:
the first destination address includes a first Internet Protocol address and a first port number;

the second destination address includes a second Internet Protocol address and a second port number; and
(i) the first Internet Protocol address differs from the second Internet Protocol address; or
(ii) the first port number differs from the second port number.

11. A network device, comprising:
a processing circuit; and
memory, operatively connected to the processing circuit and storing instructions that, when executed by the processing circuit, cause the network device to perform a method, the method comprising:
receiving, by the network device, a first packet, at a first destination address, the first packet including a source address;
receiving notification of a denial of service attack associated with the source address;
sending, by the network device, a message to the source address, the message including a second destination address and instructions, the instructions instructing the recipient of the message to send subsequent packets to the second destination address; and
sending, by the network device, a message to a network routing device, to drop subsequent packets addressed from the source address and to the first destination address,
wherein the instructions are transmitted within the network layer of a second packet.

12. The network device of claim 11, wherein the network device is an authoritative name server.

13. The network device of claim 11, wherein the network device is a Domain Name System (DNS) resolver.

14. The network device of claim 11, wherein the first packet is a User Datagram Protocol (UDP) packet.

15. The network device of claim 11, wherein the instructions further instruct the recipient to, after a set time interval, cease sending subsequent packets to the second destination address and resume sending packets to the first destination address.

16. The network device of claim 11, wherein the second packet is an Internet Protocol packet.

17. The network device of claim 11, wherein the instructions are transmitted within the transport layer of the second packet.

* * * * *